United States Patent
Jayant et al.

[11] Patent Number: 5,828,413
[45] Date of Patent: *Oct. 27, 1998

[54] METHOD AND APPARATUS FOR IMAGE PROCESSING USING MODEL-BASED LOCALIZED QUANTIZATION

[75] Inventors: Nuggehally S. Jayant, Morris, N.J.; Moshe Porat, Haifa, Israel

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 531,807

[22] Filed: Sep. 21, 1995

[51] Int. Cl.$^6$ ............................................... H04N 7/30
[52] U.S. Cl. .......................... 348/422; 348/420; 382/253
[58] Field of Search .............................. 348/14, 384, 390, 348/405, 409–412, 414, 415, 417, 418, 422, 420; 382/232, 251, 253; H04N 7/130

[56] References Cited

U.S. PATENT DOCUMENTS

| | | |
|---|---|---|
| 4,862,261 | 8/1989 | Tanaka ..................................... 348/422 |
| 5,086,439 | 2/1992 | Asai et al. ............................... 348/422 |
| 5,136,663 | 8/1992 | Nishio ..................................... 348/422 |
| 5,172,228 | 12/1992 | Israelsen ................................. 348/422 |
| 5,444,488 | 8/1995 | Goubault et al. ....................... 348/417 |
| 5,592,227 | 1/1997 | Feng ....................................... 348/414 |
| 5,610,657 | 3/1997 | Zhang ..................................... 348/415 |

OTHER PUBLICATIONS

Y. Linde et al., "An Algorithm for Vector Quantizer Design", IEEE Transactions on Communcations, vol. COM–28, No. 1, Jan. 1980.

M. Goldberg et al., "Image Sequence Coding Using Vector Quantization", IEEE Transactions on Communications, vol. COM–34, No. 7, Jul. 1986.

S. Panchanathan et al., "Adaptive Algorithms for Image Coding Using Vector Quantization", Signal Processing: Image Communication, vol. 4, pp. 81–92, 1991.

Primary Examiner—Richard Lee

[57] ABSTRACT

The apparatus and method presented use a localized model-based approach to compress video image signals for applications such as video teleconferencing. Preferably, the apparatus and method use three-dimensional vector quantization (3D VQ), recent localized history of the image signals, and a pyramidal hierarchial encoding technique to compress the image signals.

19 Claims, 5 Drawing Sheets

METHOD AND APPARATUS FOR IMAGE PROCESSING USING MODEL-BASED LOCALIZED QUANTIZATION

BACKGROUND OF THE INVENTION

1. Technical Field

The apparatus and method according to the present invention relates to image processing, particularly image processing which includes model-based localized vector quantization of the source image for applications such as video teleconferencing and videotelephony.

2. Discussion of Related Art

The ability of an image processing system to code a source image, transmit the coded information at low data rate over existing telephone lines, and reproduce the source image with minimal distortion at a location remote from the source has been a basic design goal. The communication of the coded information at low data rate is especially important for international telecommunications, where the available telephone lines have limited bandwidth.

Compared to speech communication, visual communication generally requires a higher bandwidth transmission medium because images contain significantly more information than speech. In some applications, the inherent redundancy in image sequences is much higher than more information than speech. In some applications, the inherent redundancy in image sequences is much higher than in still images. In fact, for many sequences, the differences between consecutive frames are often very minor, and if using the signal-to-noise ratio (SNR) criterion, by representing a frame by its previous one, the SNR is sometimes higher than in coding results when comparing a reconstructed frame to its original version.

Particularly in the case of video teleconferencing, where commonly the source image comprises head-and-shoulder information, the inherent redundancy is further increased. Under such conditions, where the background remains almost unchanged and the major relevant information relates to localized limited changes, improved techniques may be used for teleconferencing at low bit coding.

Since the distortions of video teleconferencing tend to concentrate mainly at very specific areas like edges and moving details, their contribution to the global SNR is sometimes rather small, giving a good result although the artifacts are quite noticeable. In such a case global SNR is meaningless, and its use is more appropriate for coding in which the distortion is spread more uniformly over the entire image. Otherwise, quantitatively speaking, representing a frame by its previous one is sometimes superior to any other coding scheme.

Generally, there are four basic approaches to image coding: (1) entropy coding in which no loss of information is expected; (2) predictive strategies where mainly the changes are dealt with; (3) transform-based coding where a transformed version of an image is coded; and (4) cluster coding which basically relates to vector quantization (VQ).

In other areas of data coding for transmission such as in speech coding and facsimile, it is known that improved compression may result if additional information related to the source of the transmitted data is considered. For example, a model is developed for the information source and the parameters of the model is coded instead of the raw information. The digital facsimile is another example which models the scan of a typical printed page in which short sequences of black and some longer sequences of white are more expected than other combinations. In the area of image coding, it is generally known that images are not created by a well defined source and thus lack common characteristics. The models that do exist in the image processing area rely on general assumptions like spatial high correlation, as used in the Markov process model:

$f(1,1)=\xi(1,1)$ $f(m,1)=\rho_v \cdot f(m-1,1)+\xi(m,1)\ m>1$ $f(1,n)=\rho_h \cdot f(1,n-1)+\xi(1,n)\ n>1$ $f(m,n)=\rho_v \cdot f(m-1,n)+\rho_h \rho_v \cdot f(m-1,n-1)+\xi(m,n)\ n>1\ \text{and}\ m>1$ where $\xi$ is a noise source and $\rho_v$ and $\rho_h$ are the vertical and horizontal correlation parameters.

The general Markov process models are of limited use. The basic assumption does not fit many images and by its nature, does not rely on information related directly to the source image or the visual system.

Accordingly, a need exists for an image coding system which encodes and communicates at a bit rate which is far below the entropy, at high compression ratio, and uses information about the specific characteristics of both the source, the viewer, and the visual system to reproduce the image with minimal distortion.

SUMMARY OF THE INVENTION

An illustrative embodiment of the present invention is a method for encoding a source signal for transmission at a compressed bit rate to a remote receiver. The received signals are decoded to reproduce the source signal. The method comprising the steps of:

partitioning the source signal into a plurality of blocks, each of the blocks including a portion of the source signal; recording historical data representing said at least a portion of the source signal; generating a plurality of increasingly refined codebooks based on the historical data, the codebooks having a first codebook and a second codebook, the second codebook more refined than the first codebook; encoding at least one of the blocks with the first codebook; determining an error criterion; and further encoding the at least one of the blocks with the second codebook when the error criterion is less than a preset threshold.

The steps of encoding may further include the step of localizing portions of the blocks having increased dynamic characteristics and adding vectors adjacent to the localized portions of the blocks for further encoding.

The step of generating a plurality of increasingly refined codebooks is preferably by three-dimensional vector quantization.

Further, the step of creating the codebooks is preferably duplicated in the receiver.

Advantageously, the method according to an illustrative embodiment of the invention transmits the encoded source signal over a transmission medium to the receiver at a compression ratio of greater than 1:100.

An apparatus according to the illustrative embodiment of the present invention comprises: means for dividing at least one of the frames representing image signals into a plurality of blocks, each of the blocks including a portion of the image signals; a memory for storing historical data of at least one of the frames; means for generating a plurality of increasingly refined codebooks based on the historical data, the codebooks having a first codebook and a second codebook, the second codebook being more refined than the first codebook; and an encoder for encoding the at least one of said blocks with the first codebook, the encoder including means for determining an error criterion, and for further encoding with the second codebook when the error criterion is less than a preset threshold.

DETAILED DESCRIPTION OF PREFERRED EMBODIMENTS

The apparatus and method according to the present invention process image information for coding, transmission, reception and reproduction of source images at sub-entropy bit rate and at high compression ratio. Preferably, the apparatus and method is applicable for teleconferencing and videotelephony. A model-based approach which includes specific properties related to the nature of teleconferencing is employed. For example, typical motions of recent history are likely to repeatedly appear in the next frames, such as in the case of "head and shoulder" sequences in teleconferencing. Different from other types of video sequences, such head and shoulder movements are likely to re-appear in the same areas of the image. Thus, recent localized history of prior frames or frame sequences is preferably used to model and encode present frames. The encoding process is preferably based on a pyramidal hierarchial approach. Advantageously, the transmitted rate can be further reduced by use of three dimensional vector quantization with an adaptive codebook.

Figure 1:
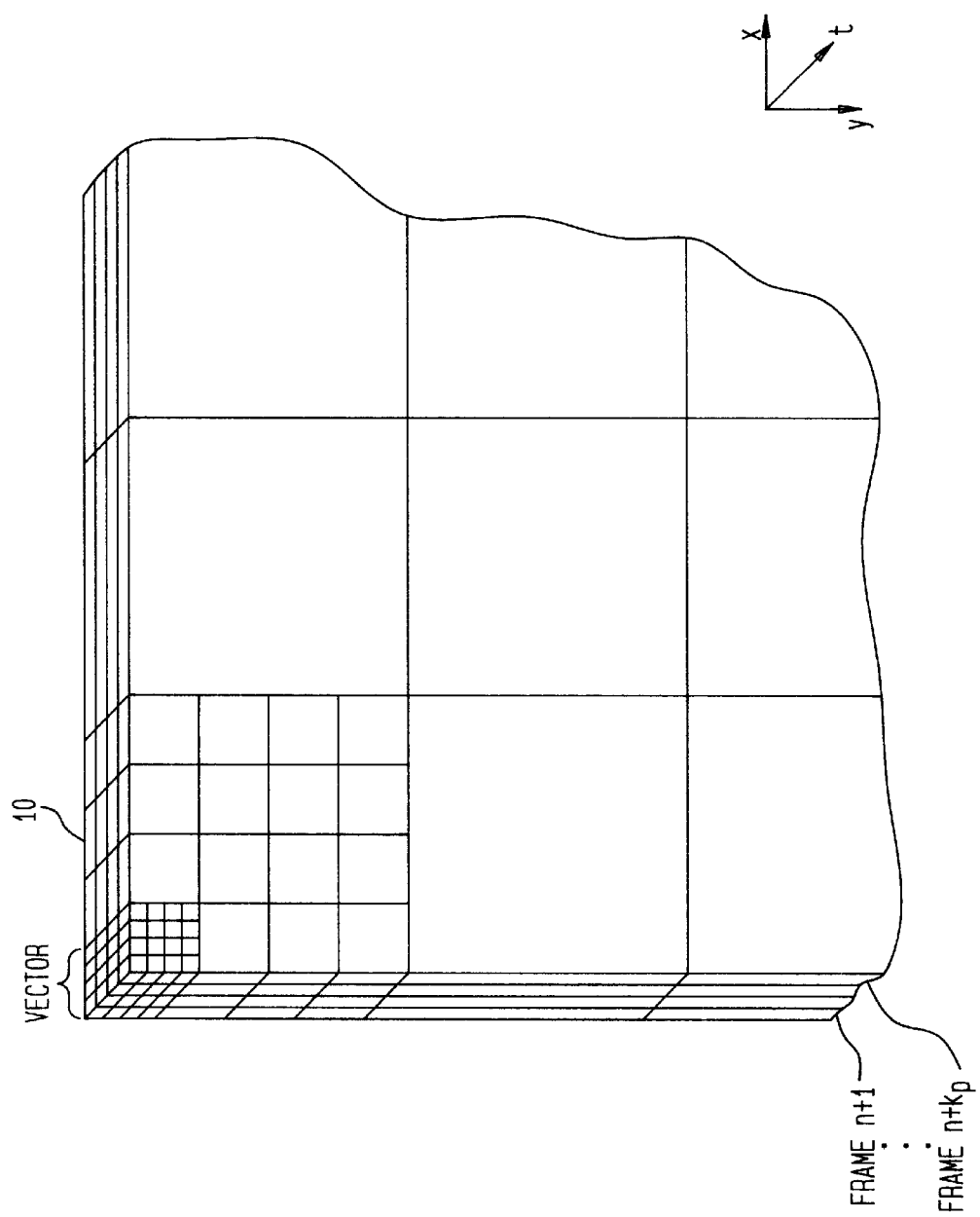
FIG. 1 shows a portion of a sequence of frames divided into blocks and vectors according to an illustrative embodiment of the invention.

FIG. 1 illustrates a representative sequence of frames (n+i) to (n+Kp), which is divided into a plurality of superblocks 10. Each of the superblocks is in turn processed into a set of 3 dimensional (3D) vectors (x, y, t).

In terms of hierarchy, the well known pyramidal approach is generally applicable to teleconferencing, but in a conditional form. If a specific motion cannot be matched accurately according to coarse partitioning of the frame in the sense of the size of each vector, a more refined description is available to improve the presentation of those details.

In terms of history, two parameters, $K_H$ and $K_P$ relate to the duration of the history used to evaluate the typical motions, and to the typical length of each movement, respectively. $K_P$ also represents the minimum expected delay of the system. The spatial area of what is considered to be the extent of typical motions is designated parameter $K_A$.

The localization parameter relates to the size $A_L$ of areas considered as likely to contain repeated motions, during the time period defined by $K_H+K_P$. As to the transformation process, parameters from the neighborhood $A_L$ are introduced. Such a neighborhood may include a small area or the entire frame.

The hierarchial approach introduces additional parameters, usually the factor by which the size of $K_A$ is changed between adjacent levels of the pyramidal representation. A factor of 2 is preferably used.

Since $K_P$ directly relates to the acceptable delay of the teleconferencing system, $K_P$ is determined according to the particular purpose of communication. For example, if interactive communication is required, the maximum delay is preferably 1/10 of a second or less, which translates into three to four or less frames. FIG. 1 shows a $K_P$ of 4 frames.

The parameter $K_H$ is less restricted. It is the length of the history to be considered for finding recent typical movements. A history in the range of 0.5 to 2.0 seconds is found to be suitable.

$A_L$ is the more flexible parameter of the model. For purposes of illustration, several blocks of the coarsest size, preferably 4×5 vectors are used.

To illustrate the effects of the present invention, consider an approach which includes vector quantization (VQ) using sparse codebooks. Usually sparse codebooks cause poor reconstruction in the areas of the image having greater detail. If the compression rate of 100 or more is required, the size of each basic vector is very large; for example, a 4-bit codebook of 16 codewords translates to 50 pixel blocks and 400 bits for 8 bits per pixel, which are obviously too coarse for the case of small moving details of teleconferencing. On the other hand a 50 pixel block or even coarser blocks may be adequate for the static parts of the image.

Having the same block size for the entire frame is therefore not an efficient solution. If global fixed block size is selected, it should account for the most detailed areas of image, usually the eyes and lips. Using the CIF standard, the global block size should be 2×2 pixels. For a 4 layer scheme, 16 pixels or 128 bits per block are needed. At such bit rate, it would be difficult to achieve a compression rate of 1:100, with codebooks of not more than 2 entries per book (1 bit).

The illustrative approach according to the present invention includes coding having adaptive block sizes which are adaptive to the different sizes of the details and the activity in various areas of the image. The basic vector size is preferably 8×8 spatially, having a depth of 4 frames, yielding a 256-pixel vector; more refined versions may be 4×4 and 2×2 spatially, corresponding to 64 and 16 pixel vectors, respectively.

Figure 2:
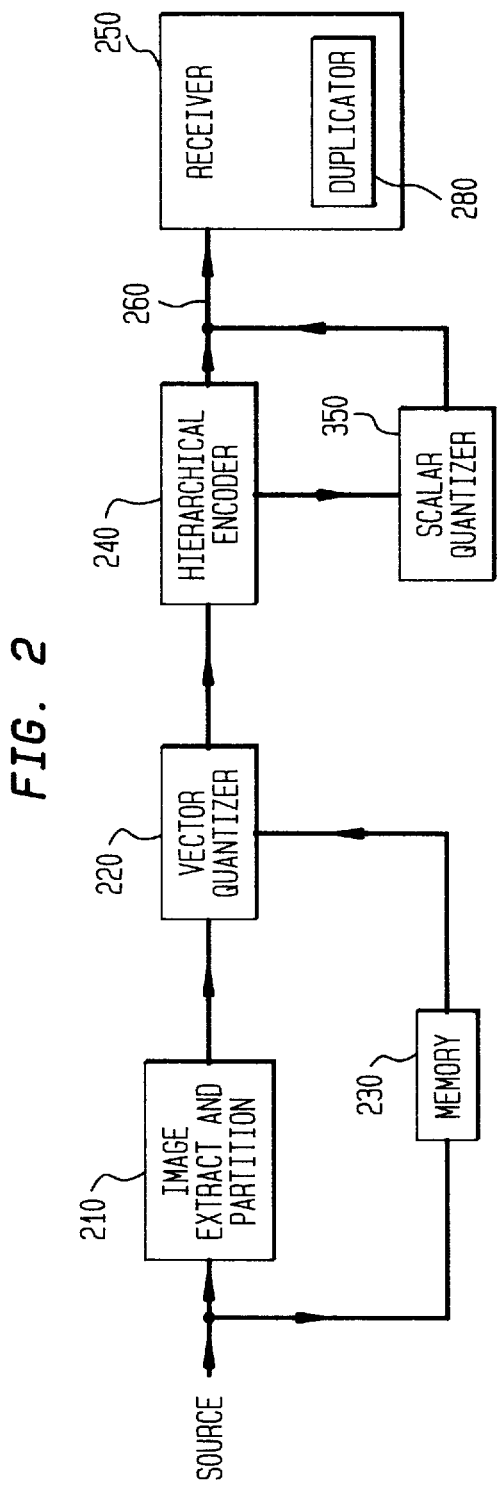
FIG. 2 shows a block diagram of an encoder in accordance with an illustrative embodiment of the invention.

FIG. 2 shows a block diagram of an apparatus which operates according to an illustrative embodiment of the invention. An image extract and partition device 210, which may include a conventional camera for capturing an image, and circuitry for processing the captured image and converting the captured frames with data signals. Each of the frames is divided into 3D superblocks (x, y, t), each comprising 3D vectors. Preferably, the superblock is 40×32×4 and the vector size is 8×8×4. The coding scheme of the illustrative embodiment of the present invention is vector quantization (VQ). As in a general VQ approach, each frame is divided into frame portions called "superblocks". Each of the superblocks includes the data or signal representing a plurality of pixels. The individual superblocks are processed into a set of vectors. A codebook that best matches the data to be quantized is created. If the same codebooks are created at the remote receiver, then only an index representing each codebook, instead of the data or vector of the entire codebook, is transmitted via the transmission medium, resulting in reduced transmitted bit rate. According to the illustrative embodiment of the present invention, a dedicated codebook is created for each superblock by vector quantizer 220, based on localized recent history of previous frames stored in frame history memory 230. Preferably, the vector in each dedicated codebook is 8×8×4 and the duration of the history stored, $K_H$, is every second. Codebooks are created in both the transmitting circuits as shown in FIG. 2 and the receiver circuit 250 by a duplicating circuit 280 in FIG. 2. The transmission medium 260 of the illustrative apparatus may be telephone lines. Modems (not shown) are preferably used at the transmitting and the receiving ends of the medium.

Figure 3:
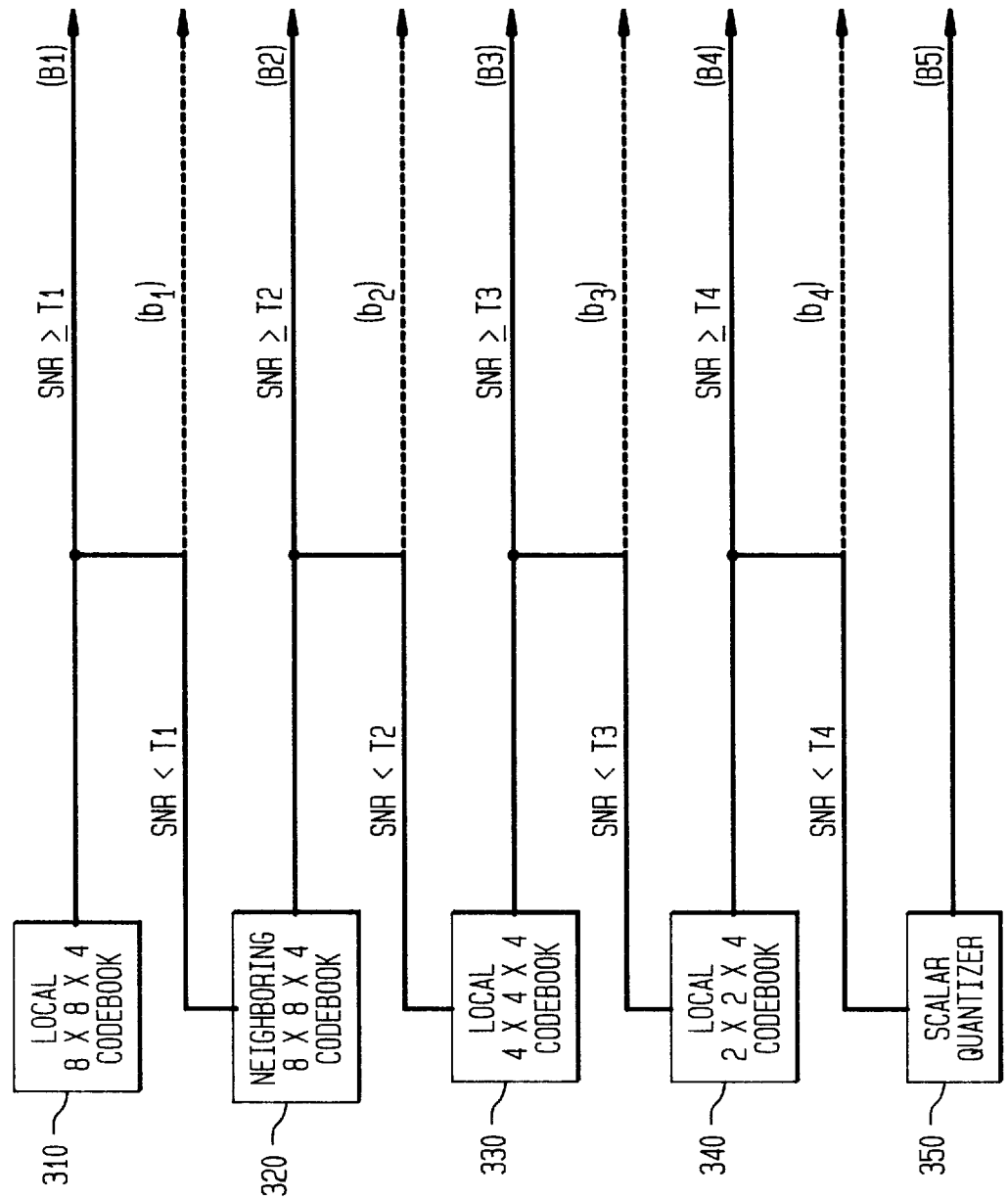
FIG. 3 shows a flow diagram illustrating an exemplary hierarchial encoding process.

A hierarchial encoding process is performed in hierarchial encoder 240. An illustrative encode process is shown in FIG. 3 as follows:

(1) The dedicated localized codebooks having the base vector 8×8×4 from the history-based VQ is searched. The blocks having a SNR greater than threshold T1 are output. For a source image of a person's head and shoulder, more than 90% of the vectors can be successfully coded at 1/40 bpp (step 310);

(2) For the vectors having a SNR less than T1, the search expands to include codebooks of adjacent superblocks. From this search, vectors having a SNR greater than T2 are output (step 320). Most of these vectors are satisfactory encoded at about 1/10 bpp;

(3) The vectors unsatisfactory encoded in Steps (1) and (2) are further coded using more refined codebooks, for example, 4×4×4. Thereafter, a search is made for vectors having SNR greater than T3 and outputted (step 330);

(4) Remaining vectors are encoded using 2×2×4 codebooks and are output if the encoded vectors have SNR greater than T4 (step 340);

(5) Those vectors inadequately coded using codebooks in the above steps are coded by scalar quantization (step 350).

Again referring to FIG. 3, B1 to B5 represent the encoded codes output to the receiver at the respective stages and b1 to b4 represent the control bits for signifying whether the B2 to B5 codes of the next stage are to be used.

An exemplary application of the illustrative embodiment of the apparatus and method of the invention is described below with the source image being a person's (female) head and shoulder, which is the typical image in teleconferencing.

Figure 4:
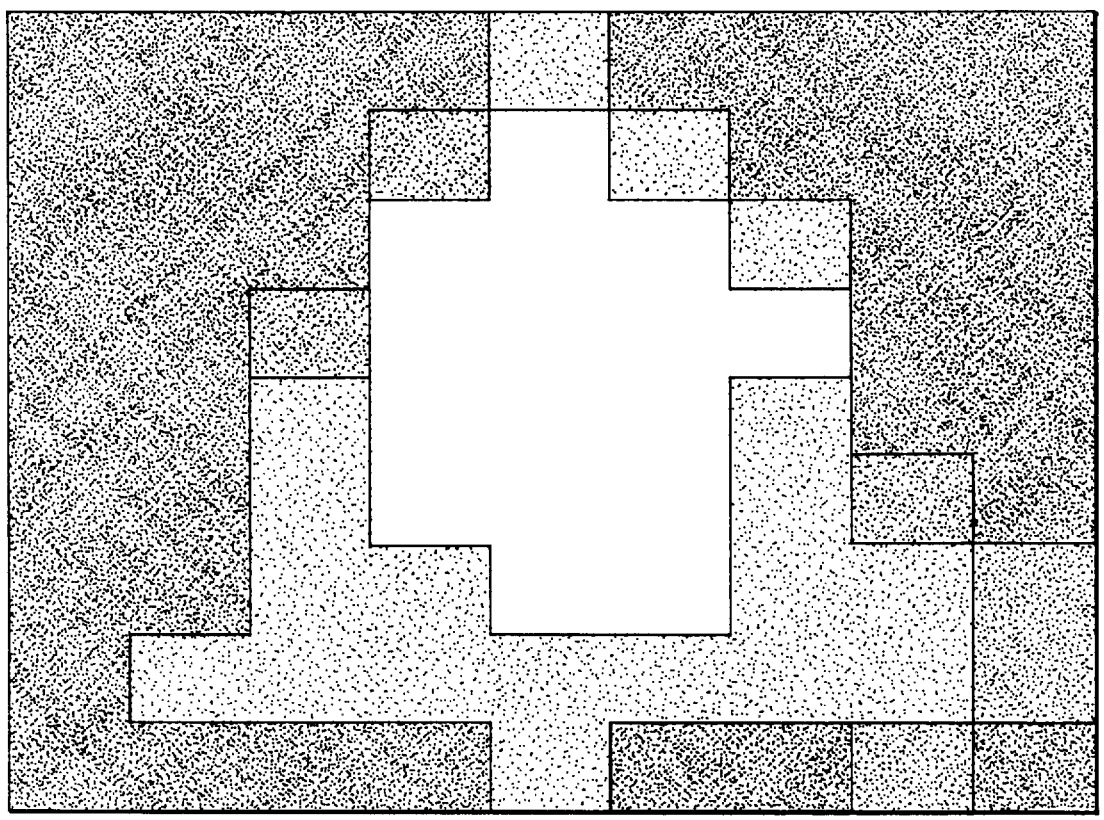
FIG. 4 shows the size of codebooks related to a history of a sequence of frames.

A frame is divided into 9×9 superblocks. For each superblock, a dynamic codebook is created, based on the last 28 frames. The basic vector size is 8×8, resulting in 20 vectors in each superblock. A localized or trained set of vectors which includes vectors of adjacent superblocks, such as two additional rows or columns of neighboring vectors, is also used to generate the codebook. The maximum number of codewords in each codebook is 512. The actual number may be less in case the localized SNR of each codebook, in representing the vectors of the training set, is achieved with a smaller size codebook. FIG. 4 illustrates the size of codebooks related to the history of the last 28 frames beginning with frame 4. The white blocks represent the maximum number of codewords (516) and the darker blocks represent smaller codebooks. It can be seen that larger codebooks are required where the activity is higher, such as at the areas of the face of a person having eye and mouth movements. In contrast, the background areas have little or no movement and has darker areas with small codebooks.

Figure 5:
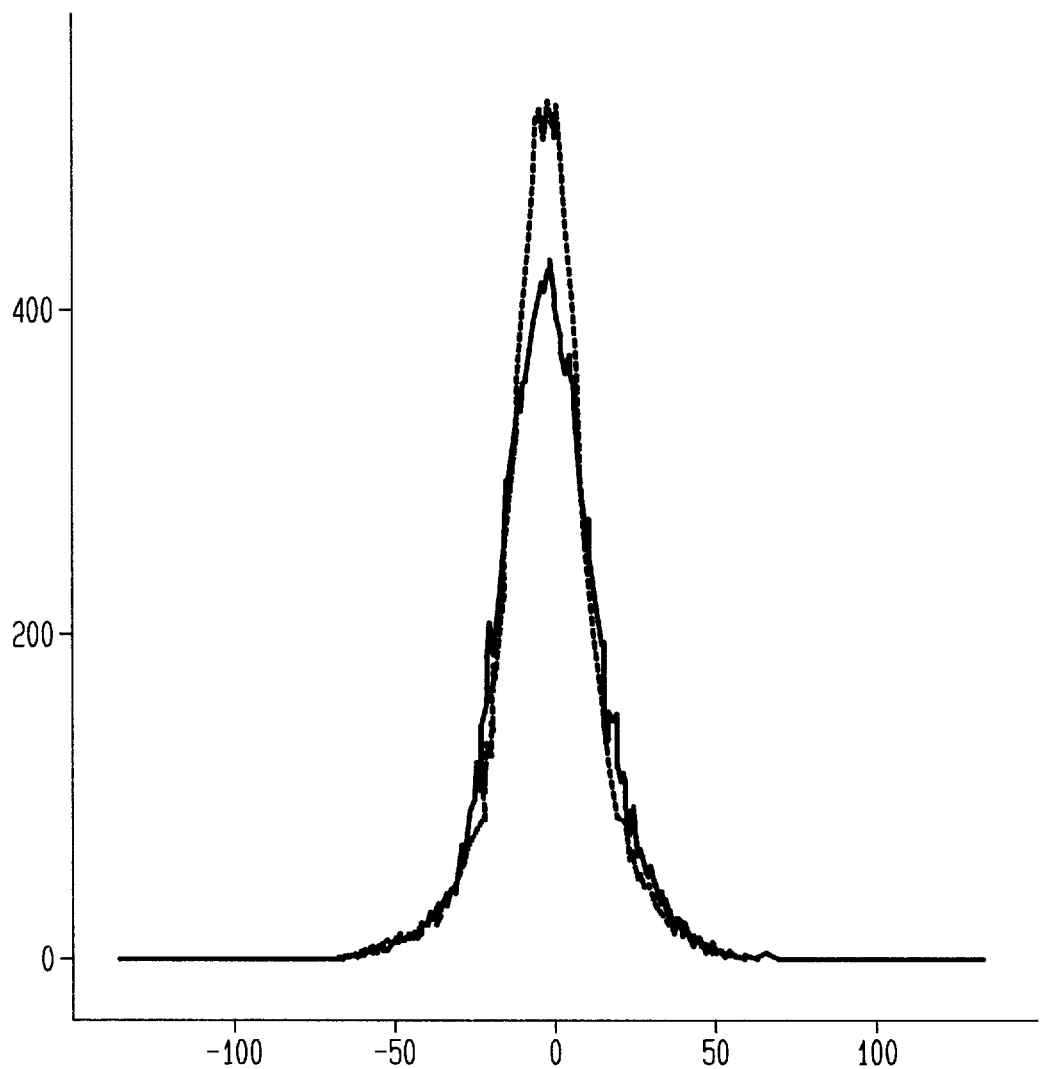
FIG. 5 is a graph showing a representative correction for the scalar quantizer.

Partial reconstruction is performed based on 8×8×4 vectors. The areas having movement, such as the general areas of the face and neck are sent to the second stage of using codewords of adjacent codebooks. Those blocks found to be adequate are added to the reconstruction. The rest are sent to the more refined stage of image representation using 4×4×4 vectors. In this stage, most of the information is successfully represented by these smaller codewords, leaving a few areas of higher activity or increased dynamic characteristics, such as at the areas of the eyes and mouth. The remaining areas are further coded based on 2×2×4 vectors. After the most refined stage, only partial areas of the eyes and mouth are left. Those blocks are sent to the last stage of the scalar quantizer. A typical correction needed in this stage is shown in FIG. 5, where the dotted curve depicts typical correction histograms, the x axis is correction amplitude and the y axis is probability. The final result, combining all stages is the reconstructed image represented by 0.0603 bit per pixel, translating to a compression ratio of 1:127. A numerical expression of the above process follows:

9×9=81 superblocks or codebooks with 20 vectors/superblock yield 1620 8×8×4 vectors for each 4 frames.
1620×8×8×4=414720 pixels(4 frames)>3,110 Kpps>24,883 Kbps (1) 8×8×4 pixel vectors, using localized codebooks:
    100% of the vectors are coded at 0.024 bpp
(2) 8×8×4 pixel vectors, using adjacent codebooks:
    9% of the vectors are coded at 0.1 bpp
(3) 4×4×4 pixel vectors, using localized and adjacent codebooks:
    3% of the vectors are coded at 0.22 bpp
(4) 2×2×4 pixel vectors, using localized and adjacent codebooks:
    1.5% of the vectors are coded at 0.81 bpp
(5) 1×1×1 vectors, using scalar guantizer:
    0.3% of the vectors are coded at 4 bpp
Total: 73K+28K+20K+38K+37K=196 Kbps
Compression: 196K bps/24,883K bps=1:127 (0.063 bpp)

The illustrative embodiment of the apparatus and method of the invention uses localized history of the sequence as a training set for 3D-VQ. This approach utilizes recent information about the sequence, thus relying on one of the most relevant source of data regarding the next frames, assuming that no major changes in the dynamics of the scene are taking place. Advantageously, the implementation of the approach can be systematically organized in parallel computing by its very nature. Even on a serial computer, the processing of many small codebooks instead of a combined one saves time and operations. In the parallel case each superblock, and there are 81 of them in the above illustration, can be considered as an almost separate subsystem, creating an adaptive codebook and coding vectors accordingly, which is practically independent of all other superblocks. The number of vectors to be coded at each 4-frame stage is 20 vectors, which is relatively small. The frame stages having fine details are coded into more refined codebooks. These frame stages involve a small fraction of the basic stage. It should be noted that the available processing time for each 4-frame processing is 4/30 second, i.e., 133 mSec.

The illustrative embodiment according to the present invention replaces the global SNR with a localized version, e.g., the transition from one level of the pyramidal representation to the next, a more detailed one.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

What is claimed is:

1. A method of encoding a source signal for transmission at a compressed bit rate to a receiver, said source signal having a plurality of frames, said method comprising the steps of:

partitioning at least one of said plurality of frames into a plurality of blocks, each of said blocks including a portion of said source signal;

recording historical data representing said at least one of said plurality of frames;

generating a plurality of increasingly refined codebooks for each of said plurality of blocks based on historical data of previous frames stored in memory and said historical data representing said at least one of said plurality of frames, said codebooks having a first codebook and a second codebook, the second codebook being more refined than the first codebook;

encoding at least one of the blocks with the first codebook;

determining a first error criterion;

further encoding said at least one of the blocks with the second codebook when said first error criterion is less than a first preset threshold; and scalar quantizing portions of said one of said blocks.

2. The method according to claim 1, wherein said step of generating a plurality of increasingly refined codebooks is by use of vector quantization.

3. The method according to claim 2, wherein said vector quantization is in three dimensions.

4. The method according to claim 1, wherein said step of further encoding further includes the step of localizing by adding vectors adjacent to portions of said at least one of the blocks to form a localized block.

5. The method according to claim 1, wherein said step of recording historical data includes recording data representing at least a previous four frames.

6. The method according to claim 1, wherein said step of recording historical data includes recording for a duration in the range of 0.5 to 2.0 seconds.

7. The method according to claim 1, wherein the step of scalar quantizing portions of said one of said blocks includes the steps of determining a second error criterion and scalar quantizing portions of said one of said blocks when said second error criterion is less than a second preset threshold.

8. The method according to claim 1, wherein said source signal is transmitted over a transmission medium to said receiver at a compression ratio of greater than 1:100.

9. An apparatus for encoding image signals for transmission at a compressed bit rate to a receiver, the image signals having a plurality of frames, said apparatus comprising:

means for dividing at least one of said frames into a plurality of blocks, each of said blocks including a portion of said image signals;

a memory for storing historical data of at least one of said plurality of frames;

means for generating a plurality of increasingly refined codebooks for each of said plurality of blocks based on historical data of previous frames stored in said memory and said historical data of at least one of said plurality of frames, said codebooks having a first codebook and a second codebook, the second codebook being more refined than the first codebook;

an encoder for encoding at least one of said blocks with the first codebook, said encoder including means for determining an error criterion, and for further encoding said at least one of said blocks with the second codebook when said error criterion is less than a preset threshold; and a scalar quantizer for scalar quantizing unencoded portions of said at least one of said blocks output from said encoder.

10. The apparatus according to claim 9, wherein said means for generating is a vector quantizer.

11. The apparatus according to claim 10, wherein said vector quantizer quantizes in three dimensions.

12. The apparatus according to claim 9, wherein said encoder further includes:

localizing means for adding vectors adjacent to portions of said at least one of said blocks having said error criterion less than said preset threshold to form a localized block for further encoding by said encoder.

13. The apparatus according to claim 9, further including a receiver having means for duplicating codebooks created by said means for generating.

14. An apparatus for encoding image signals for transmission at a compressed bit rate to a receiver, the image signals having a plurality of frames, said apparatus comprising:

means for dividing at least one of said frames into a plurality of blocks, each of said blocks including a portion of said image signals;

a memory for storing historical data of at least one of said plurality of frames;

a vector quantizer for vector quantizing said at least one of said frames into a plurality of codebooks based on said historical data;

an encoder for encoding at least one of said blocks with increasingly refined codebooks, said encoder including means for localizing said at least one of said blocks having a signal-to-noise ratio (SNR) below a first preset threshold by adding vectors from other blocks adjacent to said localized one of said blocks for further encoding; and a scalar quantizer for scalar quantizing unencoded portions of said one of said blocks output from said encoder which has a SNR below a second preset threshold.

15. The apparatus of claim 14, wherein said vector quantizer quantizes in three dimensions, in the spatial areas of (x) and (y) directions and duration of history in a (t) direction.

16. The apparatus of claim 14, wherein said means for localizing adds at least two columns of vectors from said other blocks adjacent said localized one of said blocks.

17. The apparatus of claim 14, wherein said image signals are transmitted over a transmission medium, said transmission medium including telephone lines for facilitating telephonic communications.

18. The apparatus of claim 14, wherein said receiver includes means for duplicating said plurality of codebooks created by said vector quantizer.

19. A method of encoding a source signal for transmission at a compressed bit rate to a receiver, said source signal having a plurality of frames, said method comprising the steps of:

partitioning at least one of said frames into a plurality of blocks, each of said blocks including a portion of said source signal;

recording historical data representing said at least one of said plurality of frames;

generating a plurality of increasingly refined codebooks based on said historical data, said codebooks having a first codebook and a second codebook, the second codebook being more refined than the first codebook;

encoding at least one of the blocks with the first codebook;

determining a first error criterion;

further encoding said at least one of the blocks with the second codebook when said first error criterion is less than a first preset threshold;

determining a second error criterion; and scalar quantizing portions of said one of said blocks when said second error criterion is less than a second preset threshold.

* * * * *